US009806902B2

(12) United States Patent
Srivastava et al.

(10) Patent No.: US 9,806,902 B2
(45) Date of Patent: Oct. 31, 2017

(54) SCALABLE FRAMEWORK FOR MONITORING MACHINE-TO-MACHINE (M2M) DEVICES

(71) Applicant: Verizon Patent and Licensing Inc., Basking Ridge, NJ (US)

(72) Inventors: Ashok N. Srivastava, Mountain View, CA (US); Kalyan Pamarthy, San Francisco, CA (US); Santanu Das, Sunnyvale, CA (US); Yunzhu Chen, Mountain View, CA (US); An Le, San Mateo, CA (US); Xuepeng Sun, Wellesley, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 201 days.

(21) Appl. No.: 14/220,300

(22) Filed: Mar. 20, 2014

(65) Prior Publication Data
US 2015/0271033 A1    Sep. 24, 2015

(51) Int. Cl.
G06F 15/173    (2006.01)
H04L 12/28    (2006.01)

(52) U.S. Cl.
CPC ................ *H04L 12/2825* (2013.01)

(58) Field of Classification Search
USPC ........................................ 709/223, 224, 244
See application file for complete search history.

(56) References Cited

U.S. PATENT DOCUMENTS

| 5,964,839 | A  | * | 10/1999 | Johnson ............... G06Q 30/02 702/187 |
| 6,941,358 | B1 | * | 9/2005  | Joiner .................. H04L 41/147 709/220 |
| 8,661,062 | B1 | * | 2/2014  | Jamail ................ H04L 63/1416 707/802 |
| 2011/0290873 | A1 | * | 12/2011 | Nishiguchi ........... A01B 79/005 235/376 |
| 2012/0310559 | A1 | * | 12/2012 | Taft ..................... H02J 13/0013 702/62 |

(Continued)

OTHER PUBLICATIONS

Johann Schumann et al., "Toward Software Health Management with Bayesian Networks," Proceedings of the FSE/SDP workshop on Future of software engineering research, Carnegie Mellon University, Nov. 2010, 5 pages.

(Continued)

*Primary Examiner* — Lan-Dai T Truong

(57) ABSTRACT

A device receives information associated with machine-to-machine (M2M) devices connected to a host server device via a network. The information associated with the M2M devices include one or more of device information associated with components of the M2M devices, application information generated by the M2M devices, or network information associated with interactions of the M2M devices, with the network, when the M2M devices provide the application information to the host server device via the network. The device performs an analysis of the information associated with the M2M devices via one or more analytics techniques, and generates analysis information based on the analysis of the information associated with the M2M devices. The device provides the analysis information for display by the host server device.

20 Claims, 14 Drawing Sheets

(56) References Cited

U.S. PATENT DOCUMENTS

| | | | | |
|---|---|---|---|---|
| 2013/0321425 | A1* | 12/2013 | Greene | G01N 33/48 345/440 |
| 2014/0032233 | A1* | 1/2014 | Johnson | G06Q 50/22 705/2 |
| 2015/0128265 | A1* | 5/2015 | Jover | H04L 63/1425 726/23 |
| 2016/0006753 | A1* | 1/2016 | McDaid | H04L 63/1425 726/23 |
| 2016/0021239 | A1* | 1/2016 | Iwai | H04W 24/02 455/422.1 |
| 2016/0267408 | A1* | 9/2016 | Singh | G06Q 10/0635 |

OTHER PUBLICATIONS

Ashok N. Srivastava et al., "Software health management: a necessity for safety critical systems", Innovations in Systems and Software Engineering, A NASA Journal, ISSN 1614-5046, Springer, May 22, 2013, 17 pages.

Santanu Das et al., "Detecting Anomalies in Multivariate Data Sets with Switching Sequences and Continuous Streams", National Aeronautics and Space Administration (NASA), www.nasa.gov, 2009, 1 page.

Ashok N. Srivastava et al., "Vehicle-Level Reasoning Systems: Integrating System-Wide Data to Estimate the Instantaneous Health State", Society of Automotive Engineers Integrated Vehicle Health Management Book, Ian Jennions, Ed., 2011, 12 pages.

Bryan L. Matthews et al., "Space Shuttle Main Propulsion System Anomaly Detection: A Case Study", IEEE A&E Systems Magazine, Sep. 2011, 10 pages.

Ashok N. Srivastava et al., "Machine Learning and Knowledge Discovery for Engineering Systems Health Management", Chapman & Hall/CRC, Data Mining and Knowledge Discovery Series, 2012, 464 pages.

* cited by examiner

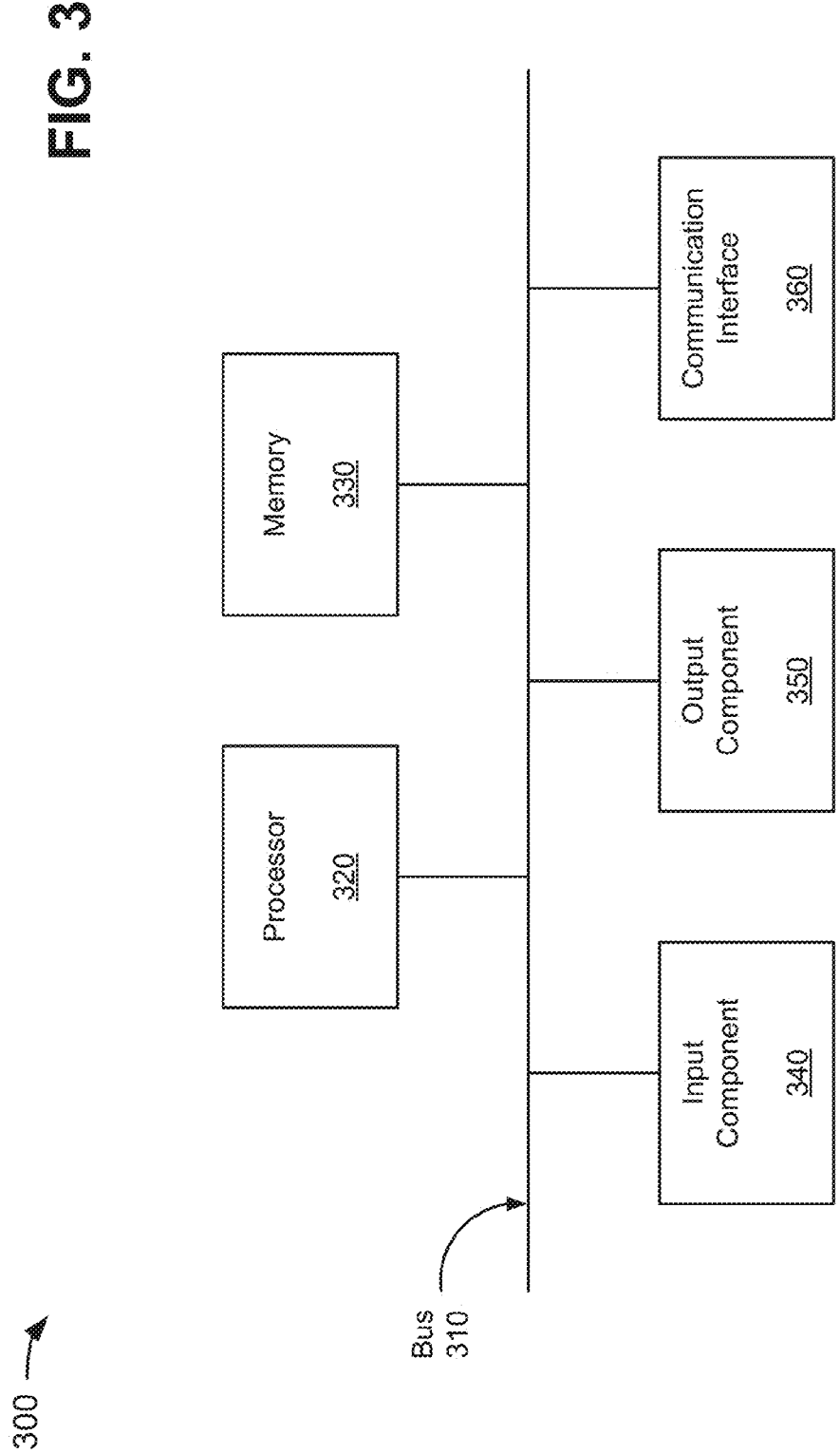

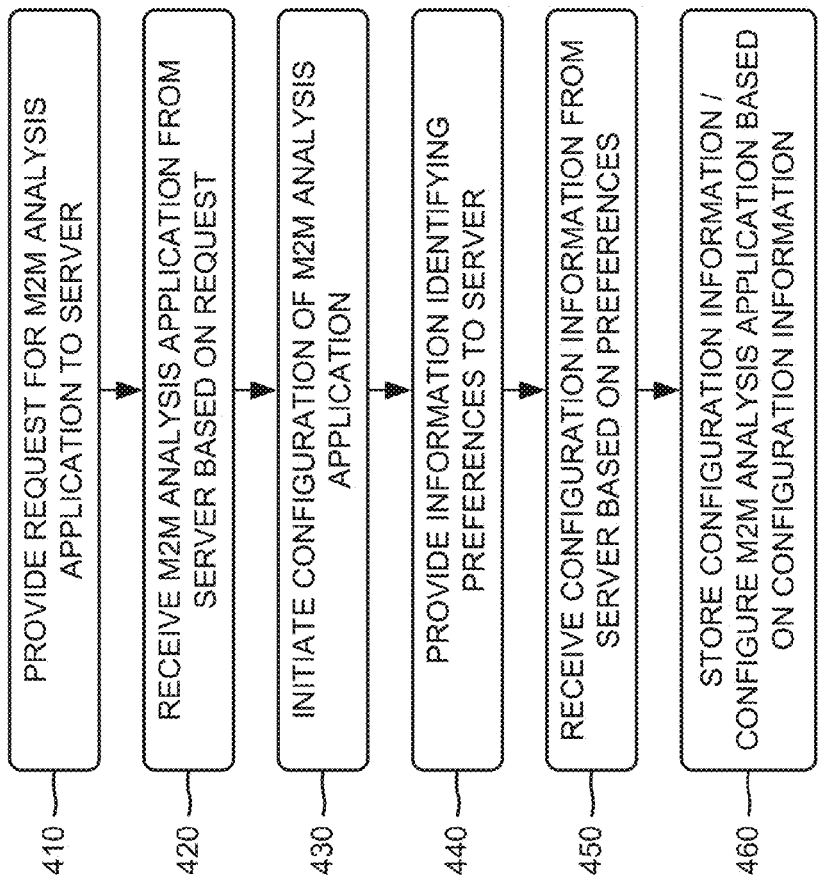

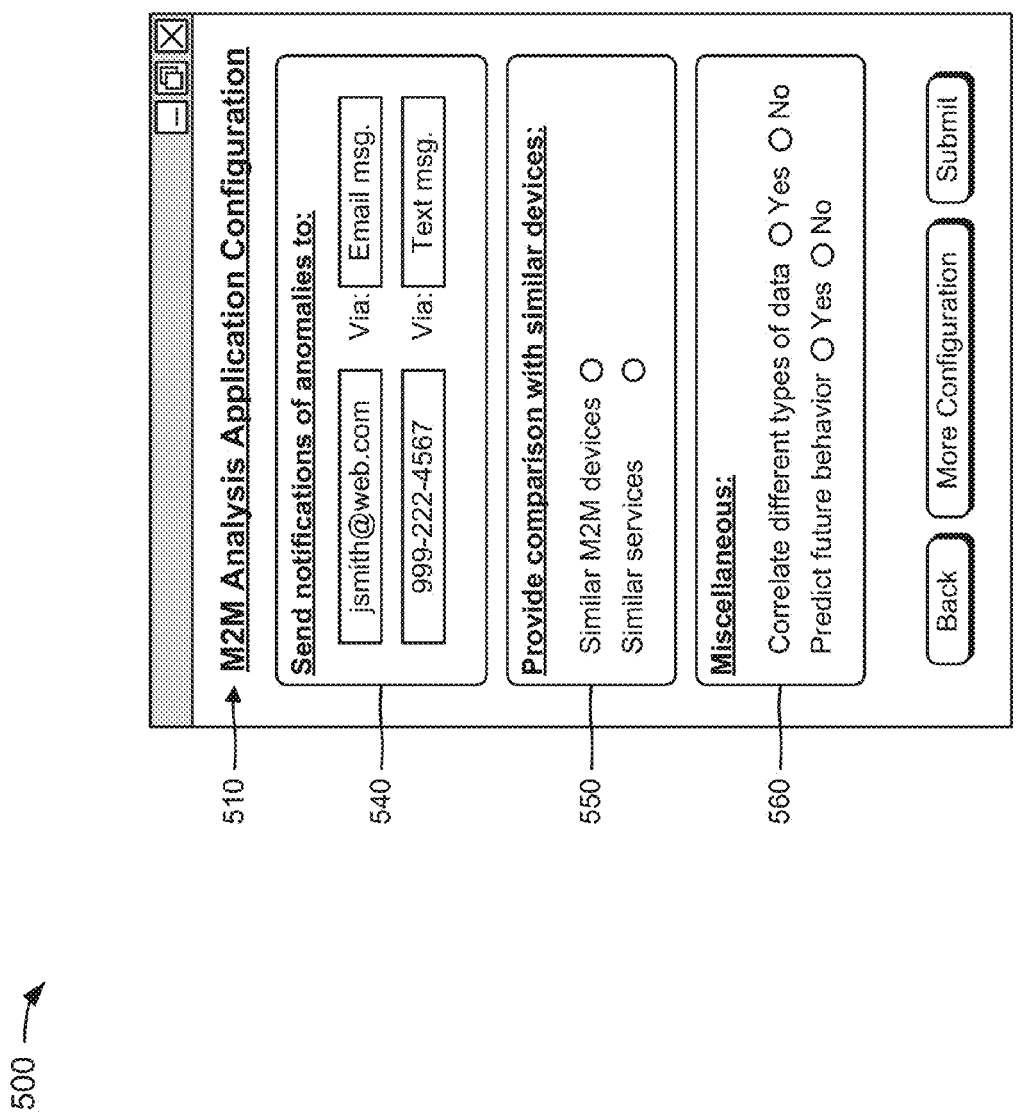

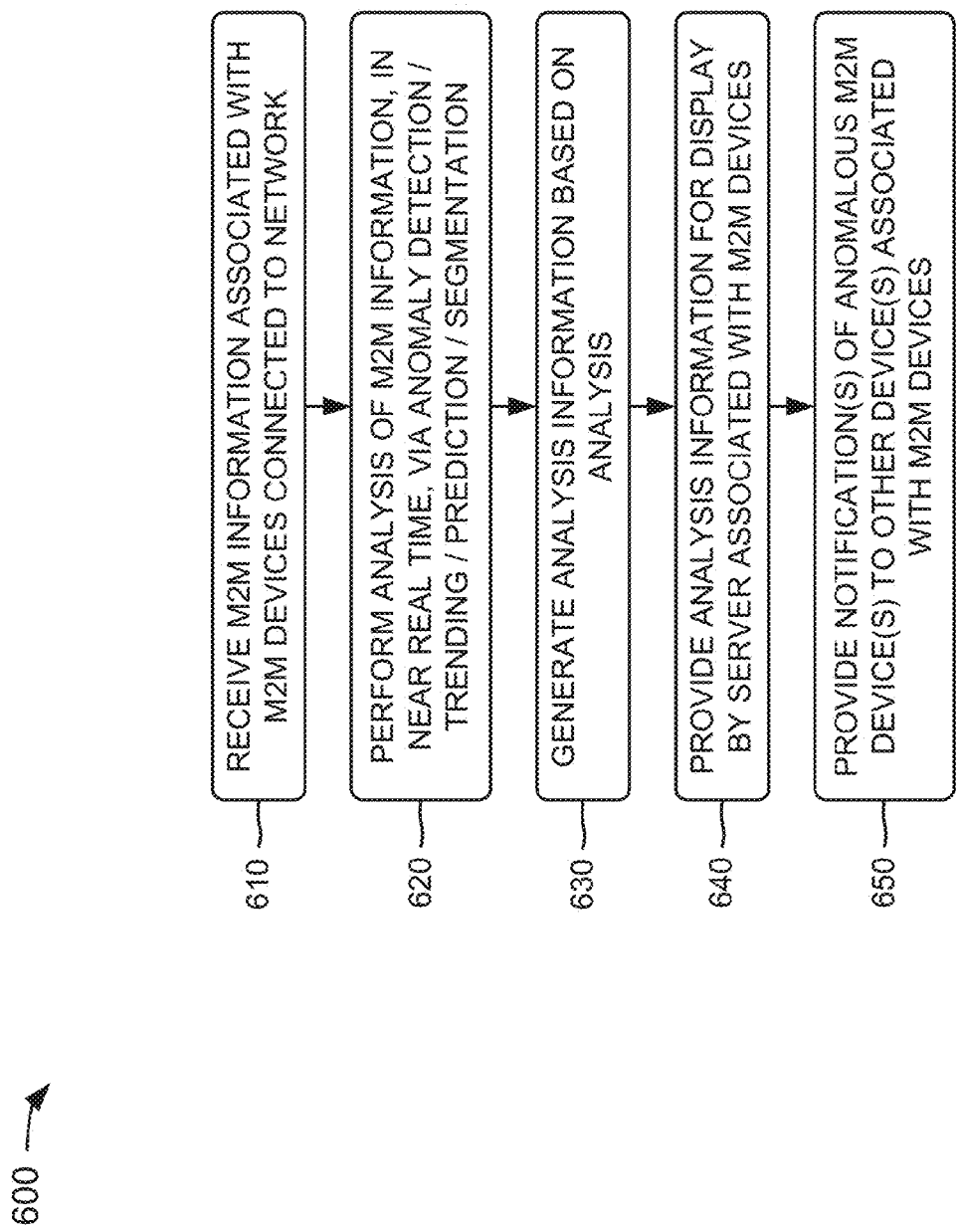

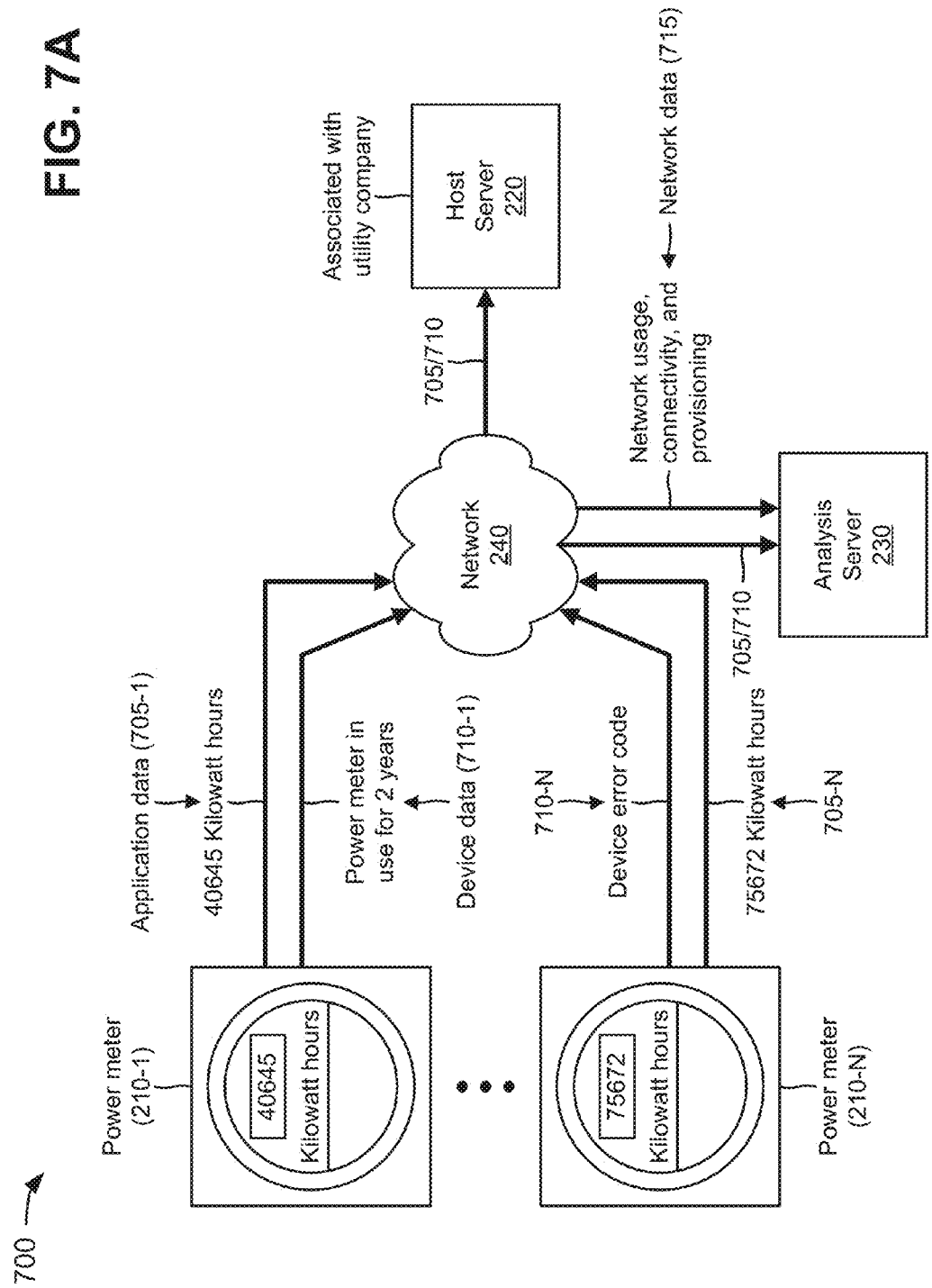

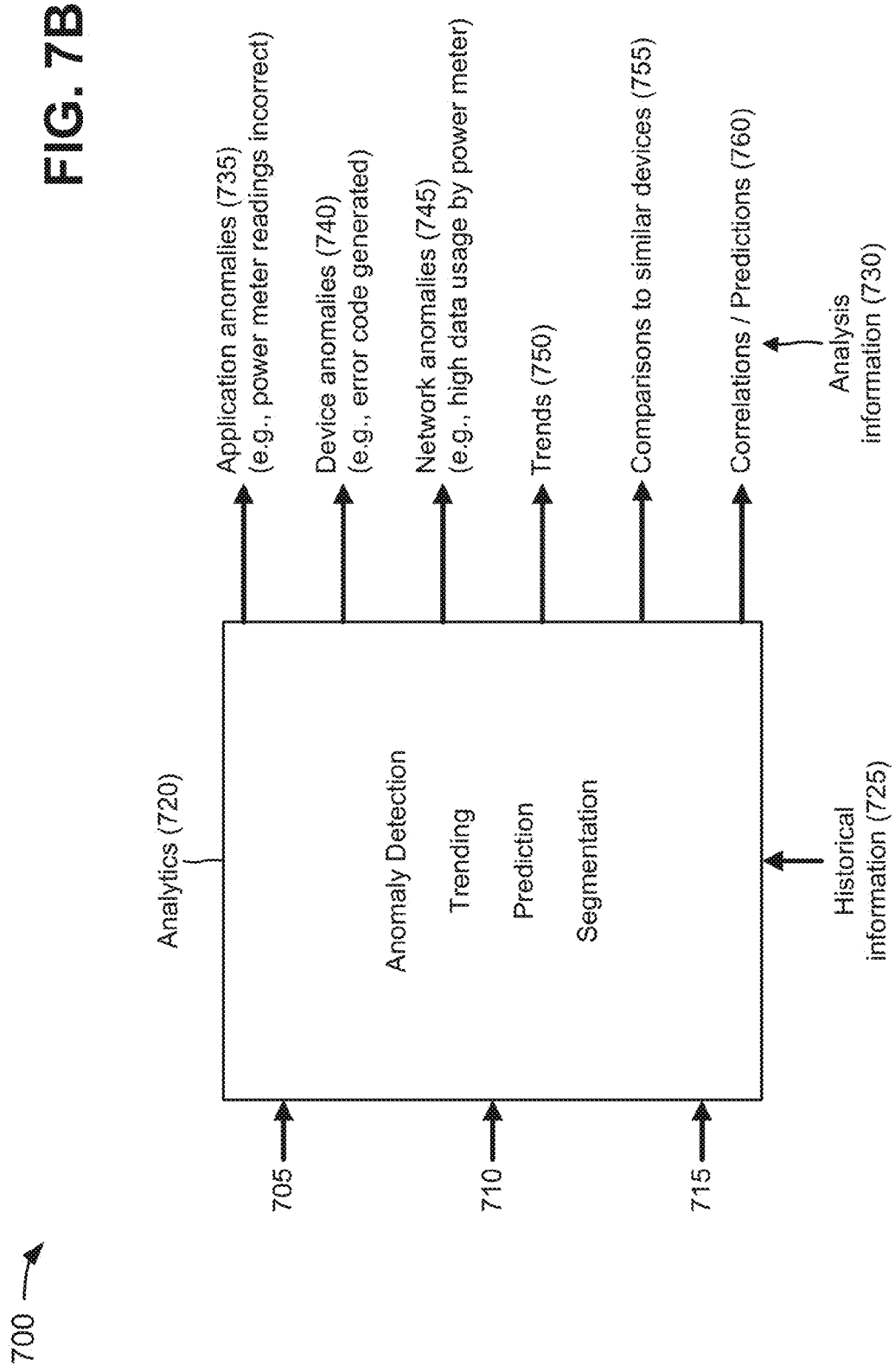

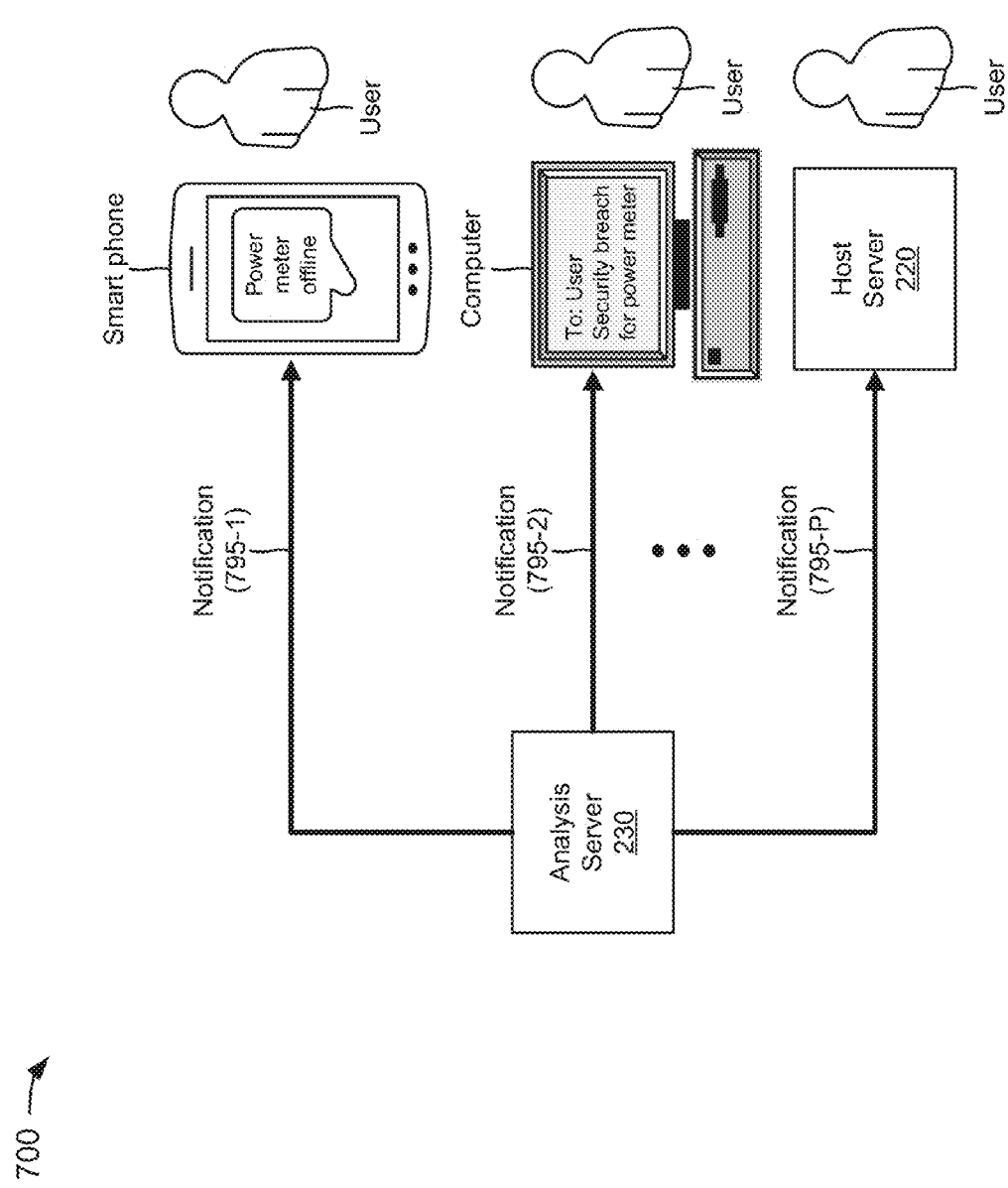

SCALABLE FRAMEWORK FOR MONITORING MACHINE-TO-MACHINE (M2M) DEVICES

BACKGROUND

Machine-to-machine (M2M) devices, such as sensors, meters, machinery, vending machines, digital billboards, telemetric devices, appliances, home security devices, automated teller machines (ATMs), healthcare devices, commercial tablet computers, etc. are becoming more and more prevalent today. M2M devices periodically connect to a network in order to communicate with host servers and to upload data to the host servers. For example, a power meter may upload power data to a host server associated with a utility company.

BRIEF DESCRIPTION OF THE DRAWINGS

FIG. 3 is a diagram of example components of a device that may correspond to one or more of the devices of the environment depicted in FIG. 2;

FIG. 4 is a flow chart of an example process for receiving and configuring a M2M analysis application for a host server;

FIGS. 5A and 5B are diagrams of example user interfaces that may be used in connection with the example process shown in FIG. 4;

FIG. 6 is a flow chart of an example process for monitoring M2M devices and analyzing information generated by M2M devices; and FIGS. 7A-7G are diagrams of an example relating to the example process shown in FIG. 6.

DETAILED DESCRIPTION OF PREFERRED EMBODIMENTS

The following detailed description refers to the accompanying drawings. The same reference numbers in different drawings may identify the same or similar elements.

Today, more and more M2M devices are communicating over a network with host servers. An entity (e.g., a utility company, a vending machine company, etc.) associated with the M2M devices may perform schedule-based or preventative maintenance of the M2M devices in order to ensure that the M2M devices are operating correctly. However, as the entity adds more and more M2M devices to the network, managing the M2M devices and performing maintenance on the M2M devices may become increasingly difficult and expensive for the entity.

Figure 1:
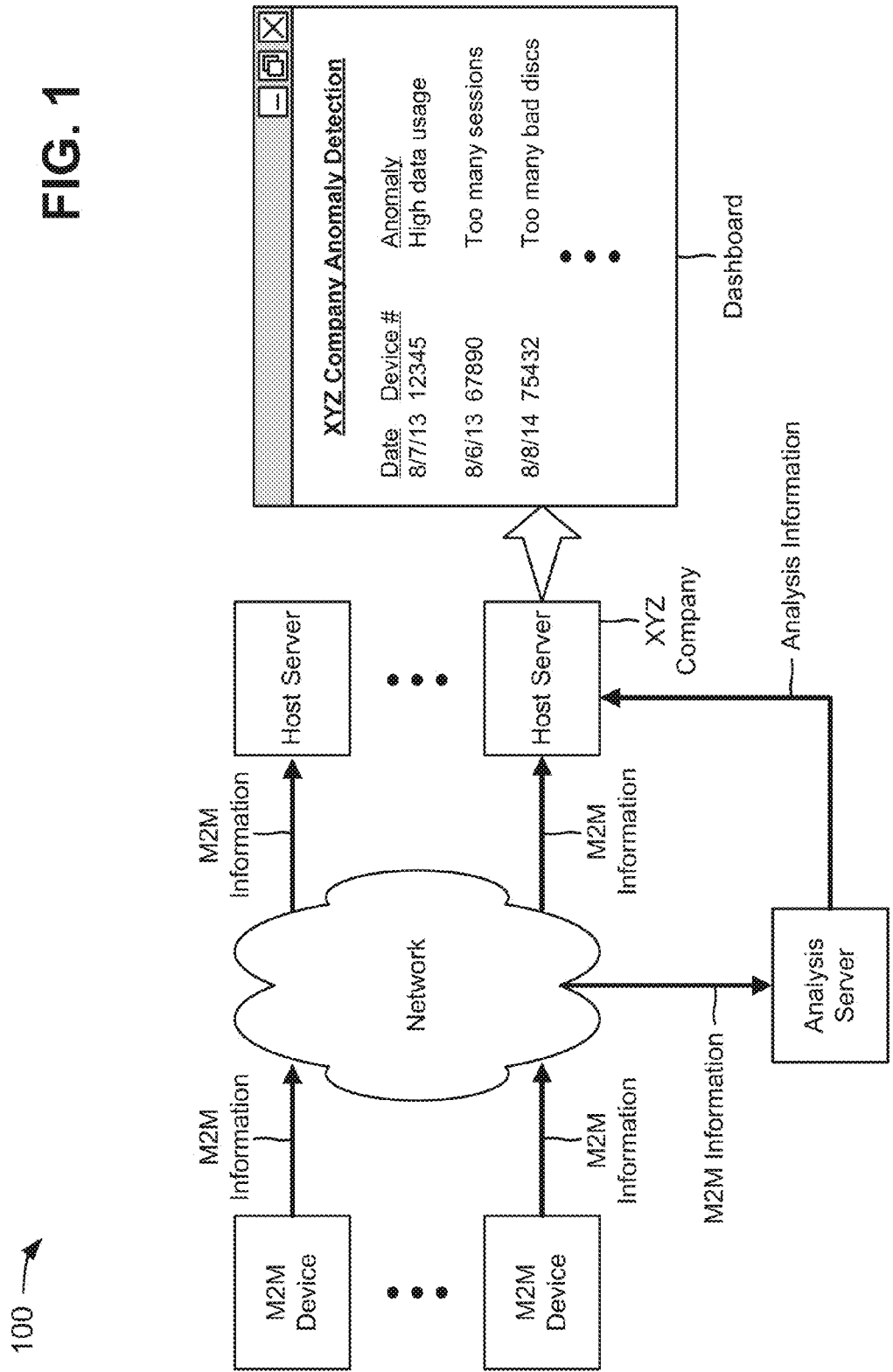
FIG. 1 is a diagram of an overview of an example implementation described herein.

FIG. 1 is a diagram of an overview of an example implementation 100 described herein. In example implementation 100, assume that multiple M2M devices are associated with a network and corresponding host servers. Further, assume that each host server is associated with one or more M2M devices. As shown in FIG. 1, the M2M devices may generate M2M information, and may utilize the network to provide the M2M information to the host servers. The M2M information may include network data (e.g., information associated with usage, connectivity, provisioning, etc. of the network by/for the M2M devices); device data (e.g., information associated with operation of the M2M devices, models of the M2M devices, etc.); and/or application data (e.g., smart meter readings, products remaining in vending machines, etc.). In some implementations, the host servers may utilize the application data to charge customers (e.g., a utility company may charge customers for power usage).

As further shown in FIG. 1, an analysis server may receive the M2M information from the M2M devices. The analysis server may perform an analysis of the M2M information, in near real time, real time, or batch time, via anomaly detection, trending, prediction, segmentation, etc. In some implementations, the analysis server may perform a particular analysis for M2M information received from M2M devices associated with a particular entity. For example, certain M2M devices may be associated with a host server of the XYZ Company, and the analysis server may perform an analysis for M2M information received from the certain M2M devices. As further shown in FIG. 1, the analysis server may generate analysis information based on the analysis of the M2M information, and may provide the analysis information, for display, to the host servers.

In some implementations, the analysis server may enable an entity (e.g., the XYZ Company) to access or receive analysis information that is customized for the entity. For example, as shown in FIG. 1, the analysis server may provide, for display, a dashboard to the host server associated with the XYZ Company. The dashboard may include analysis information that is customized for the XYZ Company, such as information associated with anomalous M2M devices associated with the XYZ Company. For example, as shown in FIG. 1, the dashboard may indicate that M2M device number "12345" is experiencing high data usage, that M2M device number "67890" is utilizing too many sessions, that M2M device number "75432" is utilizing too many bad discs, etc. Such information may enable the XYZ Company to identify M2M devices that are not operating correctly, and to correct the identified M2M devices.

Systems and/or methods described herein may provide a framework for monitoring M2M devices attached to a network and associated with entities, and the framework may scale to any number of M2M devices. The systems and/or methods may enable the entities to manage the M2M devices based on an analysis (e.g., anomaly detection, diagnosis, trending, prediction, segmentations, prognostics, etc.) of information generated by interactions of the M2M devices, via the network. The systems and/or methods may enable the entities to perform condition-based maintenance on malfunctioning M2M devices which may significantly reduce costs for the entities. The systems and/or methods may monitor the M2M devices for the entities, which may also reduce costs for the entities. Although implementations are described herein in connection with systems of M2M devices, the implementations, described herein, may be utilized with other types of systems, such as software systems with distributed portions (e.g., to detect anomalies in the distributed portions).

Figure 2:
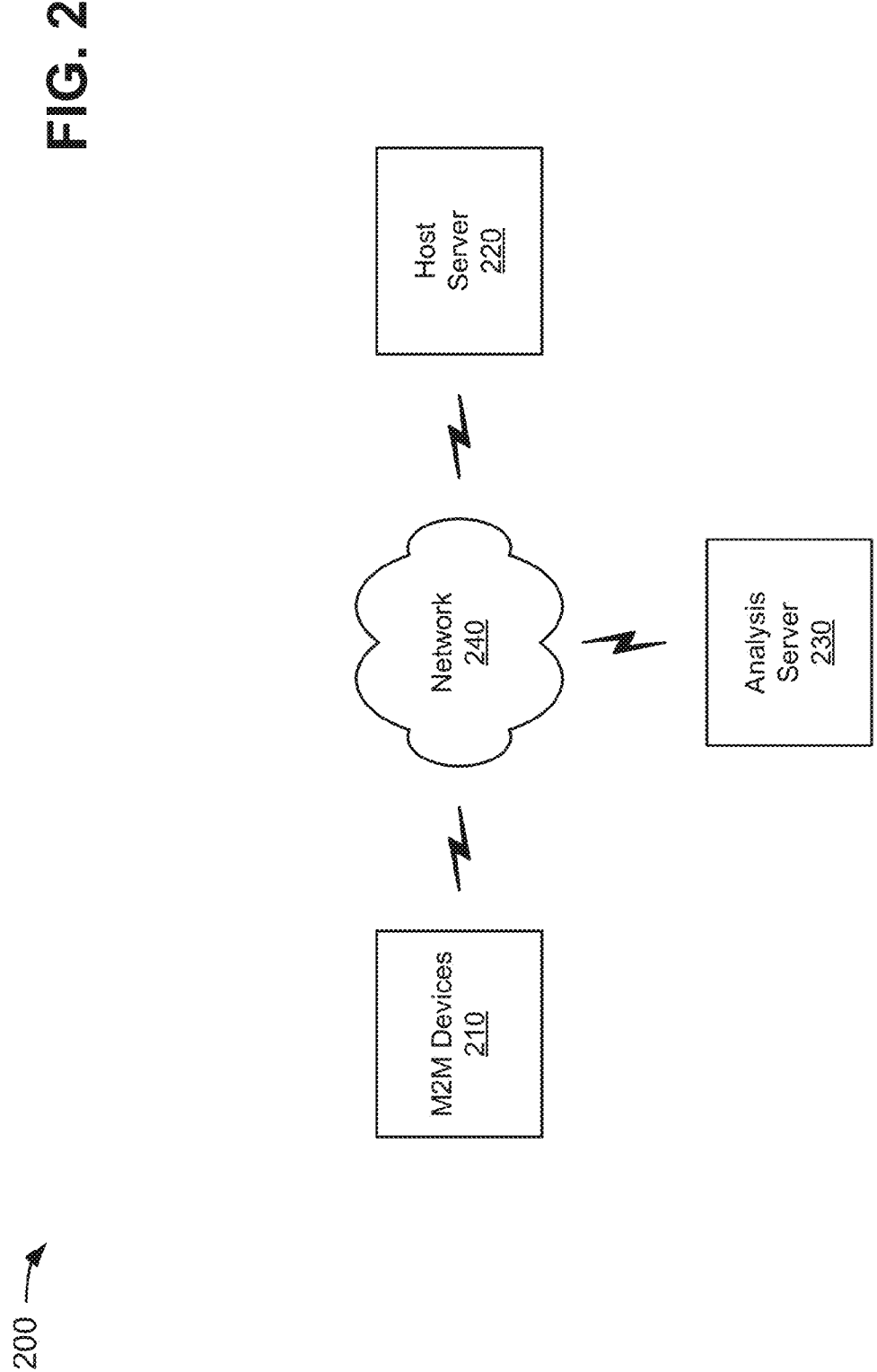
FIG. 2 is a diagram of an example environment in which systems and/or methods described herein may be implemented.

FIG. 2 is a diagram of an example environment 200 in which systems and/or methods described herein may be implemented. As illustrated, environment 200 may include M2M devices 210 (referred to collectively as "M2M devices 210," and individually as "M2M device 210"), a host server 220, an analysis server 230, and a network 240. Devices/networks of environment 200 may interconnect via wired connections, wireless connections, or a combination of wired and wireless connections.

M2M device 210 may include a device that is capable of communicating with host server 220 and analysis server 230 over network 240. In some implementations, M2M device 210 may include a sensor, a meter, machinery, a vending machine, a digital billboard, a telemetric device, an appliance, a home security device, an ATM, a healthcare device, a commercial tablet computer, etc. In some implementations, other devices, such as a radiotelephone, a personal communications services (PCS) terminal, a smart phone, a laptop computer, a tablet computer, etc. may communicate over network 240, instead of, or in addition to, M2M device 210.

Host server 220 may include one or more personal computers, one or more workstation computers, one or more server devices, one or more virtual machines (VMs) provided in a cloud computing environment, or one or more other types of computation and communication devices. In some implementations, host server 220 may be associated with an entity, such as, for example, a utility company, a home security company, a hospital, a vending machine company, a bank, etc. In some implementations, host server 220 may receive device data (e.g., information associated with operation of M2M device 210, a model of M2M device 210, error(s) generated by M2M device 210, etc.) and/or application data (e.g., information output by M2M device 210, such as, smart meter readings, vending machine supply information, home security device readings, etc.) from M2M device 210. In some implementations, host server 220 may utilize the device data and/or the application data based on the type of device data and/or application data. For example, if the device data includes information indicating that M2M device 210 is experiencing an error, host server 220 may utilize the information to instruct a technician associated with the entity to check and correct M2M device 210. In another example, if the application data includes information indicating that M2M device 210 (e.g., a vending machine) has only a few drinks remaining to dispense, host server 220 may utilize the information to instruct a technician associated with the entity to replenish the drink supply in M2M device 210.

Analysis server 230 may include one or more personal computers, one or more workstation computers, one or more server devices, one or more VMs provided in a cloud computing environment, or one or more other types of computation and communication devices. In some implementations, analysis server 230 may be associated with an entity that manages and/or operates network 240, such as, for example, a telecommunication service provider, a television service provider, an Internet service provider, etc. In some implementations, analysis server 230 may receive the device data and the application data from M2M device 210, and may receive network data (e.g., information associated with usage, connectivity, provisioning, etc. of network 240 by/for M2M device 210) from network 240. In some implementations, a device may be provided in network 240 to detect the device data, the application, and/or the network data, and to provide the detected data to analysis server 230. Analysis server 230 may perform an analysis of the received data, in near real time, real time, or batch time, via anomaly detection, trending, prediction, segmentation, etc. In some implementations, analysis server 230 may generate analysis information based on the analysis of the received data, and may provide the analysis information, for display, to host server 220.

Network 240 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, or a combination of networks.

In some implementations, network 240 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UTRAN). The EPC network may include an all-IP packet-switched core network that supports high-speed wireless and wireline broadband access technologies. The EPC network may allow M2M devices 210 to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit, etc.), a microprocessor, and/or any processing component (e.g., a field-programmable gate array (FPGA), an application-specific integrated circuit (ASIC), etc.) that interprets and/or executes instructions, and/or that is designed to implement a particular function. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, which enables device 300 to communicate with other devices, such as via a wired connection, a wireless connection, or a combination wired and wireless connections. For example, communication interface 360 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

FIG. 4 is a flow chart of an example process 400 for receiving and configuring a M2M analysis application for a host server. In some implementations, one or more process blocks of FIG. 4 may be performed by host server 220. In some implementations, one or more process blocks of FIG. 4 may be performed by another device or a group of devices separate from or including host server 220, such as analysis server 230.

As shown in FIG. 4, process 400 may include providing a request for a M2M analysis application to a server (block 410). For example, a user may cause host server 220 to provide a request for a M2M analysis application to analysis server 230. In some implementations, time M2M analysis application may include an application, a code snippet, a script, a widget, etc. that may cause host server 220 to perform one or more functions. For example, the M2M analysis application may enable the user to set preferences for receiving information (e.g., device data, application data, network data, etc.), associated with M2M device 210, that has been analyzed by analysis server 230. In some implementations, the user may cause host server 220 to access the M2M analysis application via, for example, a user interface (such as a browser) provided by analysis server 230, or in another manner. The user may then select, using host server 220, information regarding the M2M analysis application from the user interface to cause host server 220 to provide a request tier the M2M analysis application to analysis server 230. In some implementations, analysis server 230 may offer the M2M analysis application to host server 220 without host server 220 providing the request for the M2M analysis application.

As further shown in FIG. 4, process 400 may include receiving the M2M analysis application from the server based on the request (block 420). For example, host server 220 may receive the M2M analysis application from analysis server 230, and may store the M2M analysis application in a memory associated with host server 220 (e.g., memory 330, FIG. 3). In some implementations, the user, of host server 220, may establish an account associated with the M2M analysis application prior to or after receiving the M2M analysis application. In some implementations, the M2M analysis application may be stored in analysis server 230 (e.g., and not in host server 220), and host server 220 may access the M2M analysis application via the user's account.

As further shown in FIG. 4, process 400 may include initiating a configuration of the M2M analysis application (block 430). For example, the user may initiate the M2M analysis application and identify, using host server 220, one or more preferences relating to receiving information associated with M2M device 210 and analyzed by analysis server 230. In some implementations, the user may identify the one or more preferences using one or more elements of a user interface provided by host server 220 and/or analysis server 230. The one or more elements may include, for example, one or more text input elements, one or more drop down menu elements, one or more check box elements, one or more radio button elements, and/or any other types of elements that may be used to receive information from the user.

Alternatively, or additionally, the one or more preferences may include a preference of the user with respect to the M2M analysis application detecting anomalies associated with M2M device 210. For example, the M2M analysis application may detect anomalies associated with usage, connectivity, provisioning, etc. of network 240 by/for M2M device 210, security associated with M2M device 210 (e.g., if M2M device 210 has moved from a fixed location, this may indicate that M2M device 210 is stolen), application data generated by M2M device 210, etc.

Alternatively, or additionally, the one or more preferences may include a preference of the user with respect to the M2M analysis application providing trends and/or historical information associated with M2M device 210. For example, the M2M analysis application may determine trends and/or store historical information associated with usage, connectivity, provisioning, etc. of network 240 by/for M2M device 210, security associated with M2M device 210, errors generated by M2M device 210, application data generated by M2M device, etc.

Alternatively, or additionally, the one or more preferences may include a preference of the user with respect to the M2M analysis application sending notifications associated with anomalies detected for M2M device 210. For example, the user may indicate that the M2M analysis application is to send notifications to the user or to others associated with host server 220 and the entity (e.g., via a text message, an email message, voicemail message, a voice call, etc.).

Alternatively, or additionally, the one or more preferences may include a preference of the user with respect to the M2M analysis application providing a comparison of M2M device 210 with similar devices. For example, the user may indicate that the M2M analysis application is to provide a comparison of M2M device 210 with other similar M2M devices 210, devices providing similar services as M2M device 210, etc.

Alternatively, or additionally, the one or more preferences may include a preference of the user with respect to the M2M analysis application providing miscellaneous information associated with M2M device 210. For example, the user may indicate that the M2M analysis application is to correlate different types of data received from M2M device 210, predict future behavior of M2M device 210, etc.

Alternatively, or additionally, a type of the account, of the user, associated with the M2M analysis application may determine the quantity of preferences that the user is able to specify. For example, the M2M analysis application may enable the user to specify only a portion of the above preferences or specify additional preferences based on the type of the account with which the user is associated.

As further shown in FIG. 4, process 400 may include providing information identifying one or more preferences to the serve (block 440). For example, the user may cause host server 220 to provide, to analysis server 230, information identifying the one or more preferences relating to the user and provided during the configuration of the M2M analysis application.

As further shown in FIG. 4, process 400 may include receiving configuration information from the server based on the preferences (block 450). For example, host server 220 may receive, from analysis server 230, configuration information that may be used to configure the M2M analysis application to receive information associated with M2M device 210 and analyzed by analysis server 230.

In some implementations, analysis server 230 may generate the configuration information, which may be used to configure the M2M analysis application, based on the information identifying the one or more preferences of the user. For example, the configuration information may include information that causes the M2M analysis application to receive information associated with M2M device 210 and analyzed by analysis server 230.

Alternatively, or additionally, the configuration information may include information that causes analysis server 230 to detect anomalies associated with M2M device 210, and to provide information associated with the detected anomalies to host server 220. Alternatively, or additionally, the configuration information may include information that causes analysis server 230 to provide trends and/or historical information, associated with M2M device 210, to host 220.

Alternatively, or additionally, the configuration information may include information that causes analysis server 230 to send notifications (e.g., to other users and devices other than host server 220) associated with anomalies detected by analysis server 230 for M2M device 210. Alternatively, or additionally, the configuration it formation may include information that causes analysis server 230 to perform a comparison of M2M device 210 with similar devices, and to provide information associated with the comparison to host server 220. Alternatively, or additionally, the configuration information may include information that causes analysis server 230 to correlate different types of data received from M2M device 210, predict future behavior of M2M device 210, etc., and to provide the correlation and/or behavior to host server 220.

Alternatively, or additionally, the configuration information may be obtained from a data structure. In some implementations, analysis server 230 may provide, to host server 220, the configuration information independent of receiving the information identifying the one or more preferences of the user.

As further shown in FIG. 4, process 400 may include storing the configuration information and configuring the M2M analysis application based on the configuration information (block 460). For example, the user may cause host server 220 to store all or a portion of the configuration information received from analysis server 230. The M2M analysis application may be configured based on storing all or a portion of the configuration information. In some implementations, analysis server 230 may store all or a portion of the configuration information.

In some implementations, analysis server 230 may provide updates, to the configuration information, to host server 220 based on use of the M2M analysis application by the user and/or by other users of host servers 220. For example, analysis server 230 may receive updates, to the configuration information, from one or more other users and may provide the received updates to host server 220. Host server 220 may store the updates to the configuration information. In some implementations, analysis server 230 may provide the updates periodically based on a preference of the user and/or based on a time frequency determined by analysis server 230. In some implementations, analysis server 230 may determine whether to provide the updates based on the type of the account associated with the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
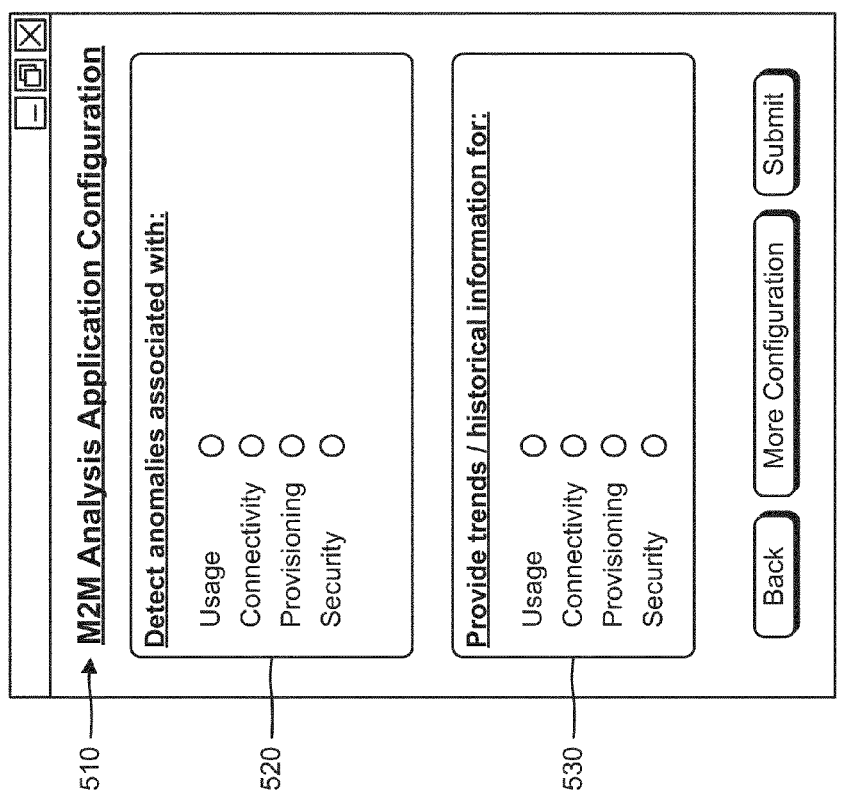

FIGS. 5A and 5B are diagrams 500 of example user interfaces that may be used in connection with example process 400 shown in FIG. 4. In some implementations, the user interfaces of FIGS. 5A and 5B may be provided by analysis server 230 to host server 220 to enable a user to identify information (e.g., preferences) that may be used to configure the M2M analysis application so that host server 220 receives information associated with M2M device 210 and analyzed by analysis server 230.

Assume that the user has previously caused host server 220 to request and download the M2M analysis application or to log into an account associated with the M2M analysis application. Further assume that the user causes host server 220 to install the M2M analysis application on host server 220. When the user logs into the account or host server 220 installs the M2M analysis application, as shown in FIG. 5A, analysis server 230 may provide a user interface 510 to host server 220, and host server 220 may display user interface 510 to the user. User interface 510 may allow the user to configure different features of the M2M analysis application. For example, the user may identify preferences for detecting anomalies associated with M2M device 210 in a first configuration section 520. In some implementations, the user may indicate that the user wants the M2M analysis application to detect anomalies associated with usage of network 240 by M2M device 210. In some implementations, the user may indicate that the user wants the M2M analysis application to detect anomalies associated with connectivity to network 240 by M2M device 210. In some implementations, the user may indicate that the user wants the M2M analysis application to detect anomalies associated with provisioning of network 240 for M2M device 210. In some implementations, the user may indicate that the user wants the M2M analysis application to detect anomalies associated with security of M2M device 210, application data generated by M2M device 210, etc.

As further shown in FIG. 5A, the user may identify preferences for providing trends and/or historical information, associated with M2M device 210, in a second configuration section 530. In some implementations, the user may indicate that the user wants the M2M analysis application to provide trends and/or historical information associated with usage of network 240 by M2M device 210. In some implementations, the user may indicate that the user wants the M2M analysis application to provide trends and/or historical information associated with connectivity to network 240 by M2M device 210. In some implementations, the user may indicate that the user wants the M2M analysis application to provide trends and/or historical information associated with provisioning of network 240 for M2M device 210. In some implementations, the user may indicate that the user wants the M2M analysis application to provide trends and/or historical information associated with security of M2M device 210, application data generated by M2M device 210, etc.

As shown in FIG. 5B, the user may identify preferences for sending notifications about anomalies, associated with M2M device 210, in a third configuration section 540. In some implementations, the user may indicate that the user wants the M2M analysis application to provide a notification about the anomalies to one or more users associated with host server 220 (e.g., and the entity associated with host server 220) and may indicate a notification method (e.g., send a notification to "jsmith@web.com" via an email message and send a notification to "999-222-4567" via a text message). In some implementations, the user may indicate that the user wants the M2M analysis application to provide a notification about the anomalies to one or more other users.

As further shown in FIG. 5B, the user may identify preferences for providing a comparison, between M2M device 210 and other devices, in a fourth configuration section 550. In some implementations, the user may indicate that the user wants the M2M analysis application to provide a comparison between M2M device 210 and other similar M2M devices 210. In some implementations, the user may indicate that the user wants the M2M analysis application to provide a comparison between M2M device 210 and devices providing similar services as M2M device 210.

As further shown in FIG. 5B, the user may identify miscellaneous preferences for the M2M analysis application in a fifth configuration section 560. In some implementations, the user may indicate that the user wants the M2M analysis application to correlate different types of data (e.g., device data, application data, network data, etc.) associated with M2M device 210. In some implementations, the user may indicate that the user wants the M2M analysis application to predict a future behavior of M2M device 210 (e.g., based on the trends and/or the historical information).

Once the user has identified the preferences, user interface 510 may allow the user to select a "Submit" option to store the preferences and/or submit the preferences to analysis server 230. Analysis server 230 may then provide, to host server 220, configuration information based on the preferences.

As further shown in FIGS. 5A and 5B, user interface 510 may also allow the user to select a "Back" option to cause host server 220 to provide information regarding the M2M analysis application. As also shown in FIGS. 5A and 5B, user interface 510 may also allow the user to select a "More Configuration" option to enable the user to identify additional information that may be used to configure the M2M analysis application.

The number of elements of user interface 510 shown in FIGS. 5A and 5B is provided for explanatory purposes. In practice, user interface 510 may include additional elements, fewer elements, different elements, or differently arranged elements than those shown in FIGS. 5A and 5B.

FIG. 6 is a flow chart of an example process 600 for monitoring M2M devices and analyzing information generated by M2M devices. In some implementations, one or more process blocks of FIG. 6 may be performed by analysis server 230. In some implementations, one or more process blocks of FIG. 6 may be performed by another device or a group of devices separate from or including analysis server 230, such as host server 220.

As shown in FIG. 6, process 600 may include receiving M2M information associated with M2M devices connected to a network block 610). For example, multiple M2M devices 210 may connect to network 240, and may be associated with a particular host server 220 and a particular entity. In some implementations, analysis server 230 may monitor device data associated with M2M devices 210, or M2M devices 210 may provide the device data to analysis server 230. In some implementations, a device in network 240 may configured to monitor and route the device data (or a copy of the device data) to analysis server 230. The device data may include, for example, information associated with operation of M2M devices 230, models of M2M devices 210, errors generated by M2M devices 210, etc. In some implementations, M2M devices 210 may generate application data, and may provide the application data to host server 220 and/or analysis server 230. In some implementations, analysis server 230 may monitor the application data associated with M2M devices 210. In some implementations, a device in network 240 may configured to monitor and route the application data (or a copy of the application data) to analysis server 230. The application data may include, for example, data generated based on operation of M2M devices 210 (e.g., smart meter readings, products supply in vending machines, home security device readings, healthcare device outputs, etc.).

In some implementations, network data may be generated by network devices of network 240 based on M2M devices utilizing network 240 to provide the device data and/or the application data to host server 220. In some implementations, analysis server 230 may monitor the network data associated with M2M devices 210. In some implementations, a device in network 240 may configured to monitor and route the network data (or a copy of the network data) to analysis server 230. The network data may include, for example, information associated with usage of network 240 by M2M devices 210, connectivity of M2M devices 210 to network 240, provisioning of network 240 for M2M devices 210, etc. In some implementations, the device data, the application data, and the network data may be referred to as M2M information, and analysis server 230 may receive the M2M information associated with M2M devices 210.

In some implementations, analysis server 230 may preprocess the M2M information utilizing feature selection (e.g., a process of selecting a subset of relevant features for use in model construction); dimensionality reduction (e.g., a process of reducing a number of random variables under consideration); normalization (e.g., adjusting values measured on different scales to a common scale); data subsetting (e.g., retrieving portions of data that are of interest for a specific purpose); etc.

As further shown in FIG. 6, process 600 may include performing an analysis of the M2M information, in near real time, real time, or batch time, via anomaly detection, trending, prediction, and segmentation (block 620). For example, analysis server 230 may perform an analysis of the M2M information, in near real time, real time, or batch time, via analytics techniques, such as anomaly detection, trending, prediction, segregation, etc. In some implementations, analysis server 230 may perform an analysis of the M2M information over time (e.g., not in near real time). In some implementations, analysis server 230 may utilize anomaly detection techniques to identify one or more anomalous M2M devices 210 based on the M2M information. Anomaly detection may generally include identifying items, events, or observations that do not conform to an expected pattern or other items, events, or observations in a dataset. In some implementations, analysis server 230 may determine normal behavior patterns associated with M2M devices 210, over time and based on the M2M information. For example, analysis server 230 may determine that M2M devices 210 have a particular usage pattern with network 240, that M2M devices 210 have a particular connectivity pattern with network 240, that M2M devices 210 generate particular application data, etc. Analysis server 230 may compare current M2M information with the determined normal behavior patterns in order to detect anomalous M2M devices 210 and/or to predict abnormal behavior of M2M devices 210 before the abnormal behavior occurs (e.g., so that preventative action may be taken). In some implementations, analysis server 230 may utilize unsupervised anomaly detection techniques, supervised anomaly detection techniques, or semi-supervised anomaly detection techniques to identify one or more anomalous M2M devices 210 based on the M2M information.

In some implementations, analysis server 230 may utilize trending techniques (or trend analysis) to determine trends in network usage, connectivity, and/or provisioning activities of M2M devices 210; trends in the device data; and/or trends in the application data. Trending techniques may generally include collecting information and attempting to determine a pattern, or a trend, in the information. Trending techniques may be used to predict future events and/or to estimate uncertain events in the past. In some implementations, analysis server 230 may analyze the network usage, connectivity, and/or provisioning activities of M2M devices 210, the device data, and/or the application data, for a particular time period, in order to identify the trends in the network usage, connectivity, and/or provisioning activities, the device data, and/or the application data associated with M2M devices 210.

In some implementations, analysis server 230 may utilize prediction techniques (or predictive analytics) to determine future behavior of M2M devices 210 based on historical M2M information and/or correlated M2M information (e.g., location information associated with M2M devices 210, destination addresses of packets generated by M2M devices 210, radio frequency (RF) data associated with M2M devices 210 connections to network 240, etc.). Prediction techniques may generally include a variety of techniques (e.g., statistics, modeling, machine learning, data mining, etc.) that analyze current and historical information to make predictions about future, or otherwise unknown, events. In some implementations, analysis server 230 may determine normal behavior patterns associated with M2M devices 210, over time and based on the M2M information. Analysis server 230 may utilize the determined normal behavior patterns in order to predict future behavior of M2M devices 210 (e.g., to predict future network usage, connectivity, and provisioning activities of M2M devices 210).

In some implementations, analysis server 230 may segmentation techniques to determine groups of M2M devices 210 that are similar in behavior (e.g., different types of M2M devices 210 may have similar network usage and connectivity behavior). Segmentation techniques may generally include dividing or clustering items into groups that are similar in specific ways relevant to the items, such as the behavior of the items. In some implementations, analysis server 230 may analyze the network usage, connectivity, and/or provisioning activities of M2M devices 210, the device data, and/or the application data, for a particular time period, in order to identify similarities in the network usage, connectivity, and/or provisioning activities, the device data, and/or the application data associated with M2M devices 210. Analysis server 230 may utilize the determined similarities to group the M2M devices 210 into groups of devices with similar behavior. In some implementations, analysis server 230 may analyze the network usage, connectivity, and/or provisioning activities of M2M devices 210, the device data, and/or the application data, for a particular time period, in order to determine correlations between different types of data (e.g., between network usage data and the application data, between the network usage data and the network connectivity data, etc.).

In some implementations, analysis server 230 may perform the analysis of the M2M information via one or more of the anomaly detection techniques, the trending techniques, the prediction techniques, the segregation techniques, and/or other analytics techniques. In some implementations, a user of host server 220 may specify which analytics techniques to perform on the M2M information. In some implementations, a number and types of analytics techniques performed by analysis server 230 on the M2M information may be based on a type of account of the user, processing power of analysis server 230, an amount of money paid by the user, etc.

As further shown in FIG. 6, process 600 may include generating analysis information based on the analysis of the M2M information (block 630). For example, analysis server 230 may generate analysis information based on the analysis of the M2M information (e.g., the device data, the application, and/or the network data) associated with M2M devices 210. In some implementations, the analysis information may include information generated by performance of the anomaly detection techniques, the trending techniques, the prediction techniques, and/or the segmentation techniques by analysis server 230. In some implementations, analysis server 230 may store the analysis information in memory (e.g., memory 330, FIG. 3) associated with analysis server 230.

In some implementations, the analysis information may include a comparison of analyzed M2M information, associated with M2M devices 210 of a first entity, and analyzed M2M information, associated with M2M devices 210 of a second entity. In such implementations, analysis server 230 may make the first entity's analyzed M2M information anonymous to the second entity, and may make the second entity's analyzed M2M information anonymous to the first entity. Such implementations may enable the first entity to determine how the first entity's M2M devices 210 are performing in comparison to similar M2M devices 210 of the second entity, and vice versa. In some implementations, analysis server 230 may process the analysis information by filtering patterns in the analysis information, performing visualization on the analysis information, interpreting patterns in the analysis information, etc.

As further shown in FIG. 6, process 600 may include providing the analysis information for display by a server associated with the M2M devices (block 640). For example, analysis server 230 may provide the analysis information, for display, to host server 220 associated with M2M devices 210. In some implementations, analysis server 230 may generate a dashboard of user interfaces that include the analysis information, and may provide the dashboard to host server 220. In some implementations, the dashboard may include information identifying anomalous M2M devices 210 associated with the entity; information identifying trends in the network data, the device data, and/or the application data associated with the entity's M2M devices 210; information identifying predicted future behavior (e.g., for the network data, the device data, and/or the application data) associated with the entity's M2M devices 210; information identifying groups of the entity's M2M devices 210 that are similar in behavior; etc.

In some implementations, the dashboard may include information that highlights problems with M2M devices 210 (e.g., anomalous M2M devices 210, M2M devices 210 that are tampered with or stolen, problem usage trends associated with particular M2M devices 210, etc.). In such implementations, the dashboard may provide relevant predictive and diagnostic information, associated with M2M devices 210, to the entity in a user interface. This may alert the entity about the problems with M2M devices 210 so that the entity may take appropriate actions to correct the problems.

In some implementations, the dashboard may aid the entity in daily management and operation of M2M devices 210, and may enable the entity to make business decisions associated with M2M devices 210. In some implementations, the dashboard may enable the entity to control operating costs associated with M2M devices 210 by alerting the entity about required maintenance of problem M2M devices 210, by identifying network issues associated with M2M devices 210, etc. In some implementations, the dashboard may enable the entity to control asset losses and costs due to data security breaches. For example, the entity may determine that a M2M device 210 is being stolen or tampered with if a location of M2M device 210 changes, a connectivity pattern of M2M device 210 changes, etc. In another example, the entity may determine data security breaches based on packet inspection, by analysis server 230, of the application data received from M2M devices 210 (e.g., with entity's permission). In some implementations, the dashboard may enable the entity to comply with legal regulations and/or to receive regulatory approval for M2M devices 210. For example, the insight provided by the dashboard into the performance of M2M devices 210 and/or network 240 may help the entity receive approval (e.g., from regulatory agencies) for spending decisions associated with M2M devices 210, and may also prevent legal liabilities associated with M2M devices 210.

As further shown in FIG. 6, process 600 may include providing one or more notifications of anomalous M2M device(s) to other device(s) associated with the M2M devices (block 650). For example, analysis server 230 may provide one or more notifications, associated with one or more anomalous M2M devices 210, to other devices associated with the entity and/or M2M devices 210. In some implementations, the entity may designate one or more employees to receive the notifications from the analysis server 230 via a variety of notification methods (e.g., an email message, a text message, etc.). For example, if the entity designated Bob to receive the notification (e.g., via Bob's email address, "bob@website.com") and Susan to receive the notification (e.g., via a text message to Susan's smart phone number "222-445-6788"), analysis server 230 may provide the notification to Bob via an email message to "bob@website.com," and may provide the notification to Susan via a text message to "222-445-6788."

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7C:
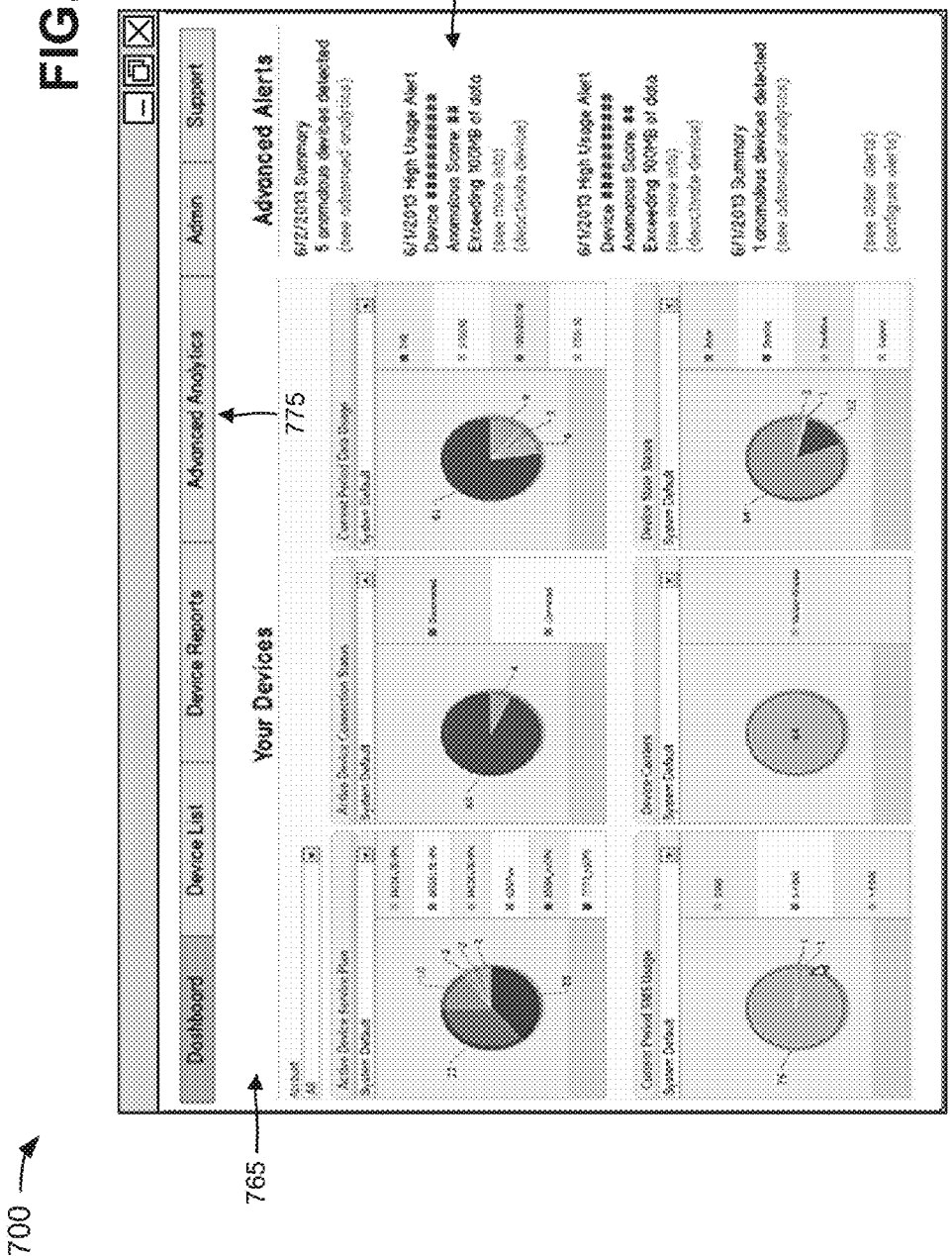

FIGS. 7A-7G are diagrams of an example 700 relating to example process 600 shown in FIG. 6. As shown in FIG. 7A, assume that multiple M2M devices 210 (e.g., power meters 210-1 through 210-N (N>1), collectively referred to as power meters 210) are managed and/or operated by a utility company (e.g., XYZ Company) associated with host server 220. Power meter 210-1 may generate application data 705-1 (e.g., 40645 Kilowatt hours) based on operation of power meter 210-1, and may provide application data 705-1 to host server 220 and analysis server 230, via network 240. Power meter 210-N may generate application data 705-N (e.g., 75672 Kilowatt hours) based on operation of power meter 210-N, and may provide application data 705-N to host server 220 and analysis server 230, via network 240. Other power meters 210 may generate application data 705, and may provide application data 705 to host server 220 and analysis server 230, via network 240.

As further shown in FIG. 7A, power meter 210-1 may generate device data 710-1 (e.g., indicating that power meter 210-1 has been in use for two years) based on operation of power meter 210-1, and may provide device data 710-1 to host server 220 and analysis server 230, via network 240. Power meter 210-N may generate device data 710-N (e.g., a device error code) based on operation of power meter 210-N, and may provide device data 710-N to host server 220 and analysis server 230, via network 240. Other power meters 210 may generate device data 710, and may provide device data 710 to host server 220 and analysis server 230, via network 240. As further shown in FIG. 7A, utilization of network 240 to provide application data 705 and device data 710 to host server 220 may generate network data 715, and network 240 may provide network data 715 to analysis server 230. Network data 715 may include usage of network 240 by power meters 210, information associated with connectivity of power meters 210 to network 240, information associated with provisioning of network 240 for power meters 210, etc.

As shown in 7B, analysis server 230 may include an analytics component 720 that receives application data 705, device data 710, network data 715, and/or historical information 725 (e.g., historical application data 705, device data 710, network data 715, etc. previously provided by power meters 210). Analytics component 720 may perform analytics techniques (e.g., anomaly detection, trending, prediction, segmentation, etc.) on application data 705, device data 710, network data 715, and/or historical information 725 to generate analysis information 730. As further shown in FIG. 7B, analysis information 730 may include anomalies 735 associated with application data 705 (e.g., power meter 210 readings are incorrect); anomalies 740 associated with device data 710 (e.g., error code generated by power meter 210-N); anomalies 745 associated with network data 715 (e.g., high data usage of network 240 by power meter 210); trends 750 associated with application data 705, device data 710, and/or network data 715; comparisons 755 of power meters 210 with similar devices (e.g., power meters of another utility company); correlations and/or predictions 760 based on application data 705, device data 710, and/or network data 715; etc. In some implementations, analysis information 730 may include network roaming patterns associated with power meters 210, network usage (e.g., cell tower usage) heat maps associated with power meters 210, analytics on fault tolerance (e.g., wireless backup) utilized by power meters 210, results of deep packet inspection of application data 705, etc.

Analysis server 230 may utilize analysis information 730 to generate first dashboard user interface 765, as shown in FIG. 7C. Analysis server 230 may provide user interface 765, for display, by host server 220 so that the utility company may review analysis information 730. As shown in FIG. 7C, user interface 765 may include information associated with power meters 210 (e.g., Your Devices), such as service plans, connection status, data usage, short message service (SMS) usage, carrier information, state status; etc. associated with power meters 210. User interface 765 may also include a section 770 that displays alerts associated with particular power meters 210 at particular times. For example, section 770 may indicate that, on Jun. 2, 2013, five anomalous power meters 210 were detected, and that, on Jun. 1, 2013, a particular power meter 210 exceeded 100 megabits (MB) of data usage. As further shown in FIG. 7C, user interface 765 may include an "Advanced Analytics" tab 775 that, when selected may provide additional analysis information 730 for display.

Figure 7D:
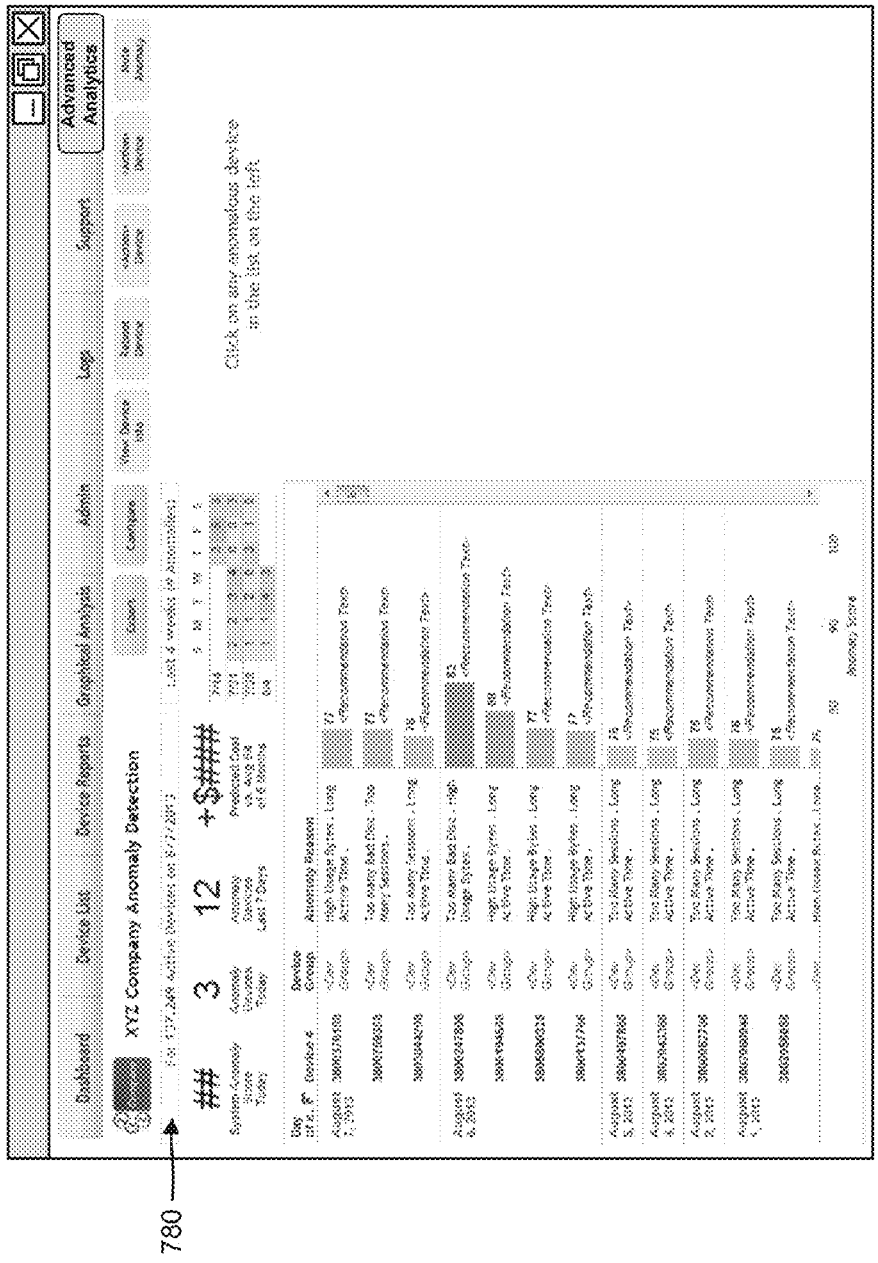

Assume that "Advanced Analytics" tab 775 is selected, and that the selection causes analysis server 230 to provide a second dashboard user interface 780, for display, by host server 220, as shown in FIG. 7D. User interface 780 may include a first section that provides information associated with power meters 210 on a particular day. For example, the first section may include information indicating that, on Aug. 7, 2013, the utility company has "137,249" active power meters; an anomaly score for the utility company on Aug. 7, 2013; a number (e.g., three) of anomalous power meters 210 detected on Aug. 7, 2013; a number (e.g., twelve) of anomalous power meters 210 detected over the last seven days; a predicted cost for the utility company for the next six months; etc. In some implementations, the anomaly score may be calculated by analysis server 230 based on a number of anomalous power meters 210 detected by analysis server 230 on Aug. 7, 2013; reasons associated with the anomalies detected for the anomalous power meters 210; etc.

As further shown in FIG. 7D, user interface 780 may include a second section that provides information associated with a number of anomalous power meters 210 detected over the last four weeks (e.g., in a calendar format). User interface 780 may include a third section that provides detailed information associated with the anomalous power meters 210 detected over a period of time. For example, the third section may include dates associated with when the anomalous power meters 210 are detected (e.g., Aug. 7, 2013, Aug. 6, 2013, etc.); device numbers associated with the anomalous power meters 210 (e.g., "3800376188," "3800759388," etc.); anomaly reasons associated with the anomalous power meters 210 (e.g., high data usage, too many had discs, too many sessions, etc); and/or graphs associated with the anomalous power meters 210.

Figure 7E:
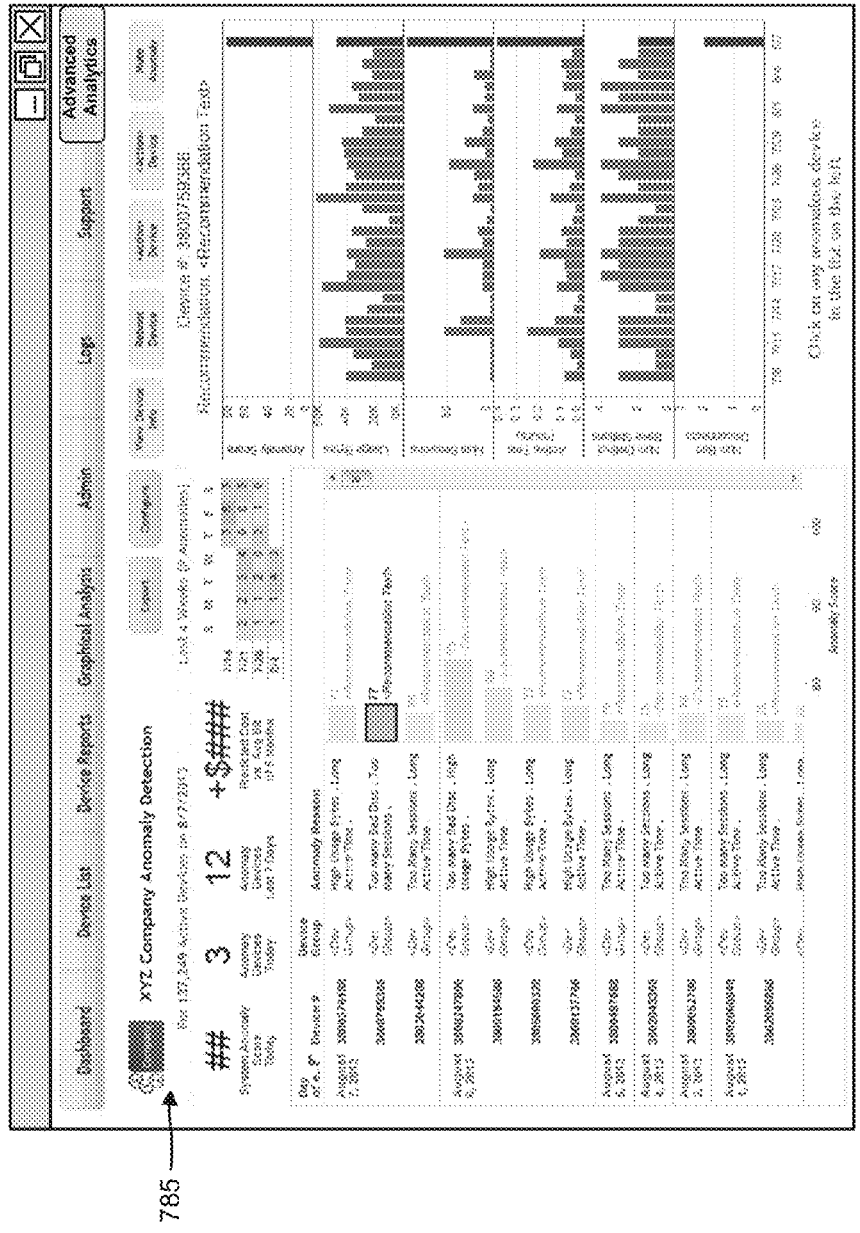

If one of the anomalous power meters 210 listed in the third section of user interface 780 is selected, analysis server 230 may provide a third dashboard user interface 785, for display, by host server 220, as shown in FIG. 7E. User interface 785 may include the first section, the second section, and the third section of user interface 780, and may include a fourth section that provides information associated with the selected anomalous power meter 210. For example, the fourth section may include information identifying an anomaly score, data usage, a number of sessions, an active time, a number of distinct base stations, a number of bad disconnects, etc. associated with the selected anomalous power meter 210. As further shown in FIG. 7E, user interface 785 may include mechanisms (e.g., tabs, icons, links, etc.) that enable the utility company return to user interface 765 (e.g., FIG. 7C), view a list of power meters 210, view reports associated with power meters 210, perform a graphical analysis of analysis information 730, export analysis information 730, configure one or more power meters 210, view device data associated with a particular power meter 210, reboot a particular power meter 210, etc.

Figure 7F:
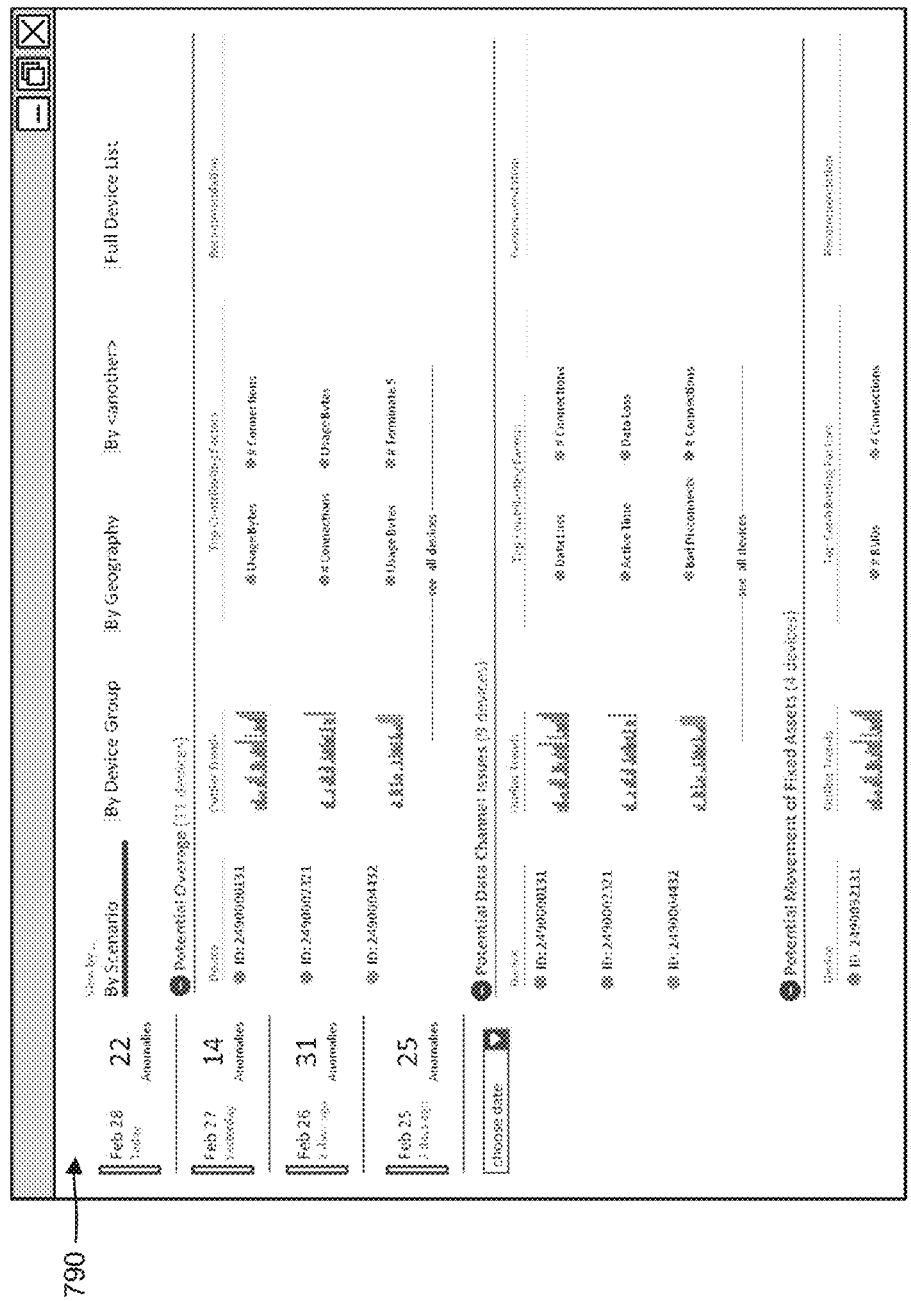

As shown in FIG. 7F, analysis server 230 may provide a fourth dashboard user interface 790, for display, by host server 220. User interface 790 may include a section that provides a number of anomalies (e.g., anomalous power meters 210) detected on a particular day. For example, the section may indicate that, on February 28, twenty-two anomalous power meters 210 were detected. User interface 790 may enable a user to view information associated with power meters 210 based on scenario, device group, geography, etc. For example, as shown in FIG. 7F, when the information associated power meters 210 is viewed based on scenario, user interface 790 may include information associated with potential overages (e.g., by eleven power meters 210), potential data channel issues (e.g., by nine power meters 210), potential movement of fixed assets, etc.

As shown in FIG. 7G, analysis server 230 may generate notifications 795-1 through 795-P based on analysis information 730. For example, as shown in FIG. 7G, analysis server 230 may provide notification 795-1 to a smart phone associated with a user (e.g., an employee of the utility company). Notification 795-1 may include a text message that indicates that a particular power meter 210 is offline. Analysis server 230 may provide notification 795-2 to a computer associated with another user (e.g., another employee of the utility company). Notification 795-2 may include an email message that indicates a security breach for a particular power meter 210. Analysis server 230 may provide notification 795-P to host server 220 associated with still another user (e.g., another employee of the utility company). Notification 795-P may include information (e.g., provided via user interface 765, FIG. 7C) that indicates high data usage for a particular power meter 210.

As indicated above, FIGS. 7A-7G are provided merely as an example. Other examples are possible and may differ from what was described with regard to FIGS. 7A-7G. In some implementations, the various operations described in connection with FIGS. 7A-7G may be performed automatically or at the request of a user.

Systems and/or methods described herein may monitor M2M devices attached to a network and associated with entities. The systems and/or methods may enable the entities to manage the M2M devices based on an analysis (e.g., anomaly detection, diagnosis, trending, prediction, segmentations, prognostics, etc.) of information generated by interactions of the M2M devices, via the network. The systems and/or methods may enable the entities to perform condition-based maintenance on malfunctioning M2M devices, which may significantly reduce costs for the entities. The systems and/or methods may monitor the M2M devices for the entities, which may also reduce costs for the entities.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not user-configurable. Information associated with the user interfaces may be selected and/or manipulated by a user (e.g., via a touch screen display, a mouse, a keyboard, a keypad, voice commands, etc.). In some implementations, information provided by the user interfaces may include textual information and/or an audible form of the textual information.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at leas in part, on" unless explicitly stated otherwise.

What is claimed is:

1. A method, comprising:
   receiving, by a device, information associated with a first set of machine-to-machine (M2M) devices connected to a host server device via a network,
   the device being different from the host server device, and
   the information associated with the first set of M2M devices including one or more of:
   device information associated with components of the first set of M2M devices, or
   application information generated by the first set of M2M devices;
   determining, by the device, normal behavior patterns, associated with the first set of M2M devices, over time;
   performing, by the device, a first analysis of the information associated with the first set of M2M devices via one or more analytics techniques,
   the first analysis, of the information associated with the first set of M2M devices, including:
   a comparison of the information associated with the first set of M2M devices and the normal behavior patterns, and
   anomaly detection to identify one or more of an item, an event, or an observation that does not conform to the normal behavior patterns based on the comparison, and
   the first analysis, of the information associated with the first set of M2M devices, being performed in at least one of:
   near real time,
   real time, or
   batch time;
   generating, by the device, analysis information based on the first analysis of the information associated with the first set of M2M devices,
   the analysis information including a comparison of the first analysis, of the information associated with the first set of M2M devices, and a second analysis of information associated with a second set of M2M devices,
   the first set of M2M devices being different from the second set of M2M devices;
   generating, by the device, a dashboard user interface that includes the analysis information and anomaly information; and
   providing, by the device and for display, the dashboard user interface to the host server device.

2. The method of claim 1, further comprising:
   providing one or more notifications associated with the analysis information to one or more other devices associated with the host server device.

3. The method of claim 2, where the one or more notifications include information associated with one or more M2M devices, of the first set of M2M devices, identified as being anomalous based on the first analysis of the information associated with the first set of M2M devices.

4. The method of claim 1, where the one or more analytics techniques include one or more of:
   an anomaly detection technique to identify one or more anomalous M2M devices, of the first set of M2M devices, based on the information associated with the first set of M2M devices,
   a trending technique to identify one or more trends for the first set of M2M devices based on the information associated with the first set of M2M devices,
   a prediction technique to predict one or more behaviors of the first set of M2M devices based on the information associated with the first set of M2M devices, or a segmentation technique to group one or more M2M devices, of the first set of M2M devices, into groups, based on the information associated with the first set of M2M devices.

5. The method of claim 1, where the analysis information includes one or more of:
information associated with one or more anomalies identified in the device information or the application information,
information associated with one or more trends identified in the device information or the application information,
information associated with one or more comparisons of the device information or the application information, associated with the first set of M2M devices, and device information or application information associated with other M2M devices, or
information associated with one or more predictions determined based on the device information or the application information.

6. The method of claim 1, further comprising:
customizing the dashboard user interface for a particular user by including analysis information and anomaly information for one or more M2M devices, of the first set of M2M devices, associated with the particular user.

7. The method of claim 1, where the analysis information includes one or more of:
information associated with a data usage level of one or more of the M2M devices of the first set of M2M devices,
information associated with a total session number for one or more of the M2M devices of the first set of M2M devices, or
information associated with a number of bad disks being utilized by one or more of the M2M devices of the first set of M2M devices.

8. A device, comprising:
one or more processors, at least partially implemented in hardware, to:
receive information associated with a first set of machine-to-machine (M2M) devices connected to a host server device via a network,
the device being different from the host server device, and
the information associated with the first set of M2M devices including one or more of:
device information associated with components of the first set of M2M devices, or
application information generated by the first set of M2M devices;
determine normal behavior patterns, associated with the first set of M2M devices, over time;
perform a first analysis of the information associated with the first set of M2M devices via one or more analytics techniques,
the first analysis, of the information associated with the first set of M2M devices, including:
a comparison of the information associated with the first set of M2M devices and the normal behavior patterns, and
anomaly detection to identify one or more of an item, an event, or an observation that does not conform to the normal behavior patterns based on the comparison, and
the first analysis, of the information associated with the first set of M2M devices, being performed in at least one of:
near real time,
real time, or
batch time;
generate analysis information based on the first analysis of the information associated with the first set of M2M devices,
the analysis information including a comparison of the first analysis, of the information associated with the first set of M2M devices, and a second analysis of information associated with a second set of M2M devices,
the first set of M2M devices being different from the second set of M2M devices;
generate a dashboard user interface that includes the analysis information and anomaly information;
store the analysis information; and
provide, for display, the dashboard user interface to the host server device.

9. The device of claim 8, where the one or more processors are further to:
provide at least one notification associated with the analysis information to at least one other device, associated with the host server device, via an email message, a text message, or a voicemail message.

10. The device of claim 9, where the at least one notification includes information associated with one or more M2M devices, of the first set of M2M devices, identified as being anomalous based on the first analysis of the information associated with the first set of M2M devices.

11. The device of claim 8, where the one or more analytics techniques include one or more of:
an anomaly detection technique to identify one or more anomalous M2M devices, of the first set of M2M devices, based on the information associated with the first set of M2M devices,
a trending technique to identify one or more trends for the first set of M2M devices based on the information associated with the first set of M2M devices,
a prediction technique to predict one or more behaviors of the first set of M2M devices based on the information associated with the plurality first set of M2M devices, or
a segmentation technique to group one or more M2M devices, of the first set of M2M devices, into groups, based on the information associated with the first set of M2M devices.

12. The device of claim 8, where the analysis information includes one or more of:
information associated with one or more anomalies identified in the device information or the application information,
information associated with one or more trends identified in the device information or the application information,
information associated with one or more comparisons of the device information or the application information, associated with the first set of M2M devices, and device information or application information associated with other M2M devices, or
information associated with one or more predictions determined based on the device information or the application information.

13. The device of claim 8, where the one or more processors are further to:
customize the dashboard user interface for a particular entity,
the customized dashboard user interface including:

the analysis information, and
anomaly information for the first set of M2M devices associated with the particular entity.

14. The device of claim 8, where the analysis information includes one or more of:
information associated with a data usage level of one or more of the first set of M2M devices,
information associated with a total session number for one or more of the first set of M2M devices, or
information associated with a number of bad disks being utilized by one or more of the first set of M2M devices.

15. A computer-readable medium for storing instructions, the instructions comprising:
one or more instructions that, when executed by one or more processors of a device, cause the one or more processors to:
receive information associated with a first set of machine-to-machine (M2M) devices connected to a host server device via a network,
the device being different from the host server device, and
the information associated with the first set of M2M devices including one or more of:
device information associated with hardware components of the first set of M2M devices, or
application information generated by the first set of M2M devices;
determine one or more normal behavior patterns, associated with the first set of M2M devices, over time;
perform a first analysis of the information associated with the first set of M2M devices via one or more analytics techniques,
the first analysis, of the information associated with the first set of M2M devices, including:
a comparison of the information associated with the first set of M2M devices and the one or more normal behavior patterns, and
anomaly detection to identify one or more of an item, an event, or an observation that does not conform to the one or more normal behavior patterns based on the comparison, and
the first analysis, of the information associated with the first set of M2M devices, being performed in at least one of:
near real time,
real time, or
batch time;
generate analysis information based on the first analysis of the information associated with the first set of M2M devices,
the analysis information including a comparison of the first analysis, of the information associated with the first set of M2M devices, and a second analysis of information associated with a second set of M2M devices,
the first set of M2M devices being different from the second set of M2M devices;
generate a dashboard user interface that includes the analysis information and anomaly information; and
provide, for display, the dashboard user interface to the host server device.

16. The computer-readable medium of claim 15, where the one or more instructions, when executed by the one or more processors, further cause the one or more processors to:
provide one or more notifications associated with the analysis information to one or more other devices associated with the host server device.

17. The computer-readable medium of claim 16, where the one or more notifications include:
information associated with one or more M2M devices, of the first set of M2M devices, identified as being anomalous based on the first analysis of the information associated with the first set of M2M devices.

18. The computer-readable medium of claim 15, where the one or more analytics techniques include one or more of:
an anomaly detection technique to identify one or more anomalous M2M devices, of the first set of M2M devices, based on the information associated with the first set of M2M devices,
a trending technique to identify one or more trends for the first set of M2M devices based on the information associated with the first set of M2M devices,
a prediction technique to predict one or more behaviors of the first set of M2M devices based on the information associated with the first set of M2M devices, or
a segmentation technique to group one or more M2M devices, of the first set of M2M devices, into groups, based on the information associated with the first set of M2M devices.

19. The computer-readable medium of claim 15, where the analysis information includes one or more of:
information associated with one or more anomalies identified in the device information or the application information,
information associated with one or more trends identified in the device information or the application information, information associated with one or more comparisons of the device information or the application information, associated with the first set of M2M devices, and device information or application information associated with other M2M devices, or
information associated with one or more predictions determined based on the device information or the application information.

20. The computer-readable medium of claim 15, where the one or more instructions, when executed by the one or more processors, further cause the one or more processors to:
determine a particular usage pattern or a particular connectivity pattern of a particular M2M device of the first set of M2M devices;
compare the information associated with the first set of M2M devices and the particular usage pattern or the particular connectivity pattern; and
determine that the particular M2M device is anomalous based on comparing the information associated with the first set of M2M devices and the particular usage pattern or the particular connectivity pattern.

* * * * *